US012658609B2

(12) United States Patent
Schneider

(10) Patent No.: US 12,658,609 B2
(45) Date of Patent: Jun. 16, 2026

(54) NON-TANGLING CANTED COIL FOR CONNECTING TOGETHER ELECTRICAL CONDUCTORS

(71) Applicant: Ennovi Industries, Inc., East Providence, RI (US)

(72) Inventor: Richard Schneider, Livonia, MI (US)

(73) Assignee: ENNOVI INDUSTRIES, INC., East Providence, RI (US)

( * ) Notice: Subject to any disclaimer, the term of this patent is extended or adjusted under 35 U.S.C. 154(b) by 153 days.

(21) Appl. No.: 18/214,407

(22) Filed: Jun. 26, 2023

(65) Prior Publication Data

US 2024/0014580 A1 Jan. 11, 2024

Related U.S. Application Data

(60) Provisional application No. 63/359,374, filed on Jul. 8, 2022.

(51) Int. Cl.
*H01B 5/04* (2006.01)
*H01R 4/48* (2006.01)
*H01R 4/58* (2006.01)

(52) U.S. Cl.
CPC ................. *H01R 4/58* (2013.01); *H01R 4/48* (2013.01)

(58) Field of Classification Search
CPC ..... H01B 5/04; F16F 1/04; F16F 1/045; F16F 1/122; F16B 37/12
USPC ................................. 174/94 R; 267/167, 178
See application file for complete search history.

(56) References Cited

U.S. PATENT DOCUMENTS 4,770,332 A 9/1988 Pomerantz
5,358,224 A * 10/1994 Balsells .................... F16F 3/12 267/167
5,540,593 A 7/1996 Takahashi
5,791,638 A * 8/1998 Balsells .................. F16F 1/123 267/167
7,154,286 B1 12/2006 Marx
7,629,534 B2 * 12/2009 Ikeda ..................... H01R 12/52 174/94 R
8,231,416 B2 7/2012 Johnston
8,523,579 B2 9/2013 Johnston
8,547,128 B1 10/2013 Sochor
8,735,751 B2 5/2014 Rust
9,147,956 B2 9/2015 Nakamura
2004/0046297 A1 * 3/2004 DeMoss ................. A47C 27/07 267/142
2014/0259617 A1 * 9/2014 Kompa ................... B23P 11/00 267/167
2017/0095258 A1 4/2017 Tassoni
2020/0233048 A1 * 7/2020 Corea ...................... H03H 3/00

FOREIGN PATENT DOCUMENTS

JP 08-200466 * 8/1996
JP 2012-077813 * 4/2012

* cited by examiner

*Primary Examiner* — Chau N Nguyen
(74) *Attorney, Agent, or Firm* — Paul Katterle

(57) ABSTRACT

A canted coil for use in a connector to make an electrical connection between conductors to form a conductor assembly. The canted coil includes a substantially cylindrical body formed from at least one length of conductive wire and having a series of adjacent loops with gaps in-between. The body has opposing first and second end portions. A blocking bar extends through the body of the canted coil, between the first and second end portions of the body.

10 Claims, 10 Drawing Sheets

NON-TANGLING CANTED COIL FOR CONNECTING TOGETHER ELECTRICAL CONDUCTORS

CROSS-REFERENCE TO RELATED APPLICATION(S)

This application claims the benefit of priority under 35 U.S.C. § 119(e) to U.S. Provisional Patent Application No. 63/359,374 filed on 8 Jul. 2022, which is herein incorporated by reference.

TECHNICAL FIELD

This disclosure relates generally to connectors having canted coils contacts for use in fastening together two parts to convey power.

BACKGROUND

One or more canted coils may be used in a connector for connecting together two parts to convey electric power between the two parts. In such a connector, the canted coil(s) may be constructed to have the turns of the coil separated from each other. Such separation of the turns may cause problems during the manufacture of the connector if the spacing between the turns is greater than the thickness of the wire forming the coil. More specifically, a plurality of the canted coils may become entangled during storage or handling, thereby requiring them to be untangled before they are mounted in the connector. The present disclosure is directed toward preventing such entanglement.

SUMMARY

In accordance with the disclosure, a canted coil is provided for use in a connector to make an electrical connection between conductors. The canted coil includes a substantially cylindrical body formed from at least one length of conductive wire and having a series of adjacent loops with gaps in-between. The body has opposing first and second end portions. A blocking bar extends through the body of the canted coil, between the first and second end portions of the body.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
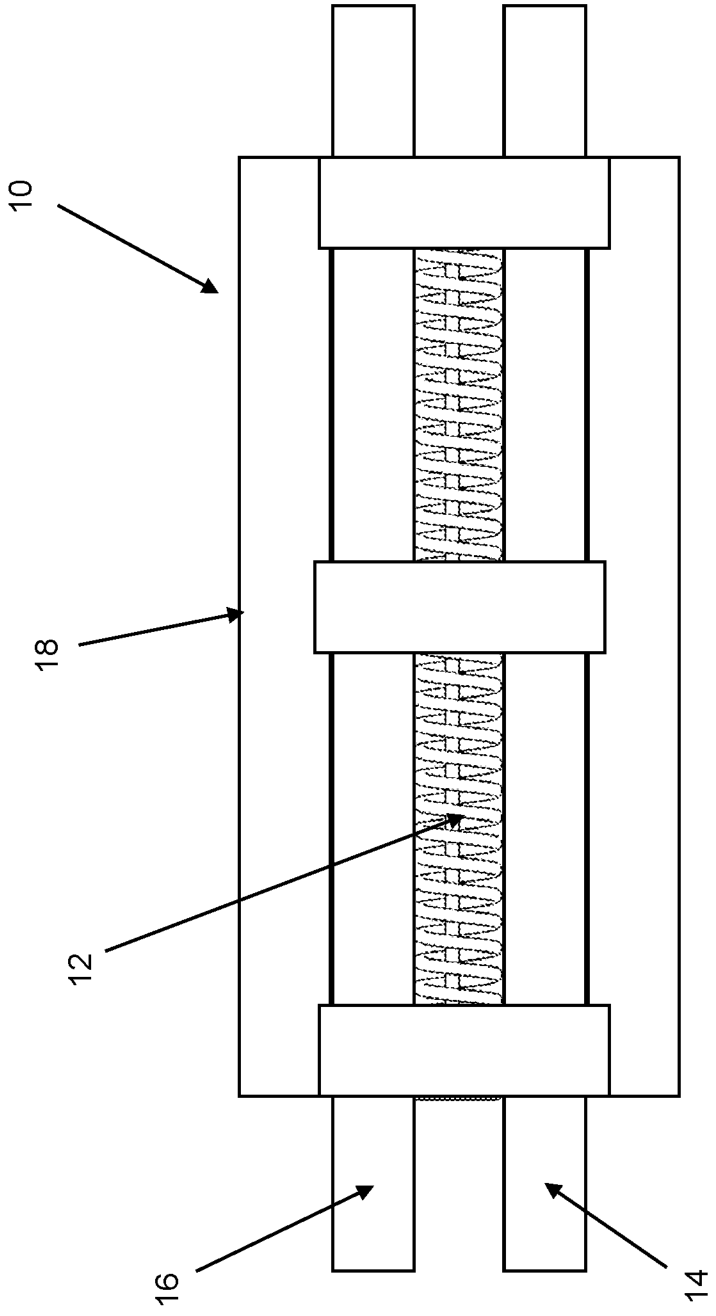
FIG. 1 shows a schematic side view of a connector having a non-tangling canted coil electrically connecting a first conductor to a second conductor.

It should be noted that in the detailed description that follows, identical components have the same reference numerals, regardless of whether they are shown in different embodiments of the present disclosure. It should also be noted that for purposes of clarity and conciseness, the drawings may not necessarily be to scale and certain features of the disclosure may be shown in somewhat schematic form.

Spatially relative terms, such as “top”, “bottom”, “lower”, “above”, “upper”, and the like, are used herein merely for ease of description to describe one element or feature’s relationship to another element(s) or feature(s) as they are illustrated in (a) drawing figure(s) being referred to. It will be understood that the spatially relative terms are not meant to be limiting and are intended to encompass different orientations of the device in use or operation in addition to the orientation depicted in the drawings.

A connector constructed in accordance with the present disclosure generally includes one or more non-tangling canted coils mounted to electrically connect two conductors. When the connector is engaged with the two conductors, the non-tangling canted coil(s) may be pressed directly against both conductors or only one of the conductors. Alternately, the non-tangling canted coil(s) may not directly press against either of the conductors.

FIG. 1 schematically shows a connector 10 having one or more non-tangling canted coils 12 electrically connecting a first conductor 14 to a second conductor 16. One side of the one or more non-tangling canted coils 12 is pressed directly against the first conductor 14, while the other side of the one or more non-tangling canted coils 12 is pressed directly against the second conductor 16. An outer clamp structure 18 may be disposed around portions of the first and second conductors 14, 16 to clamp together the first and second conductors 14, 16 with the one or more non-tangling canted coils 12 squeezed in-between. In this manner the one or more non-tangling canted coils 12 provide a direct electrical connection between the first and second conductors 14, 16.

Figure 2:
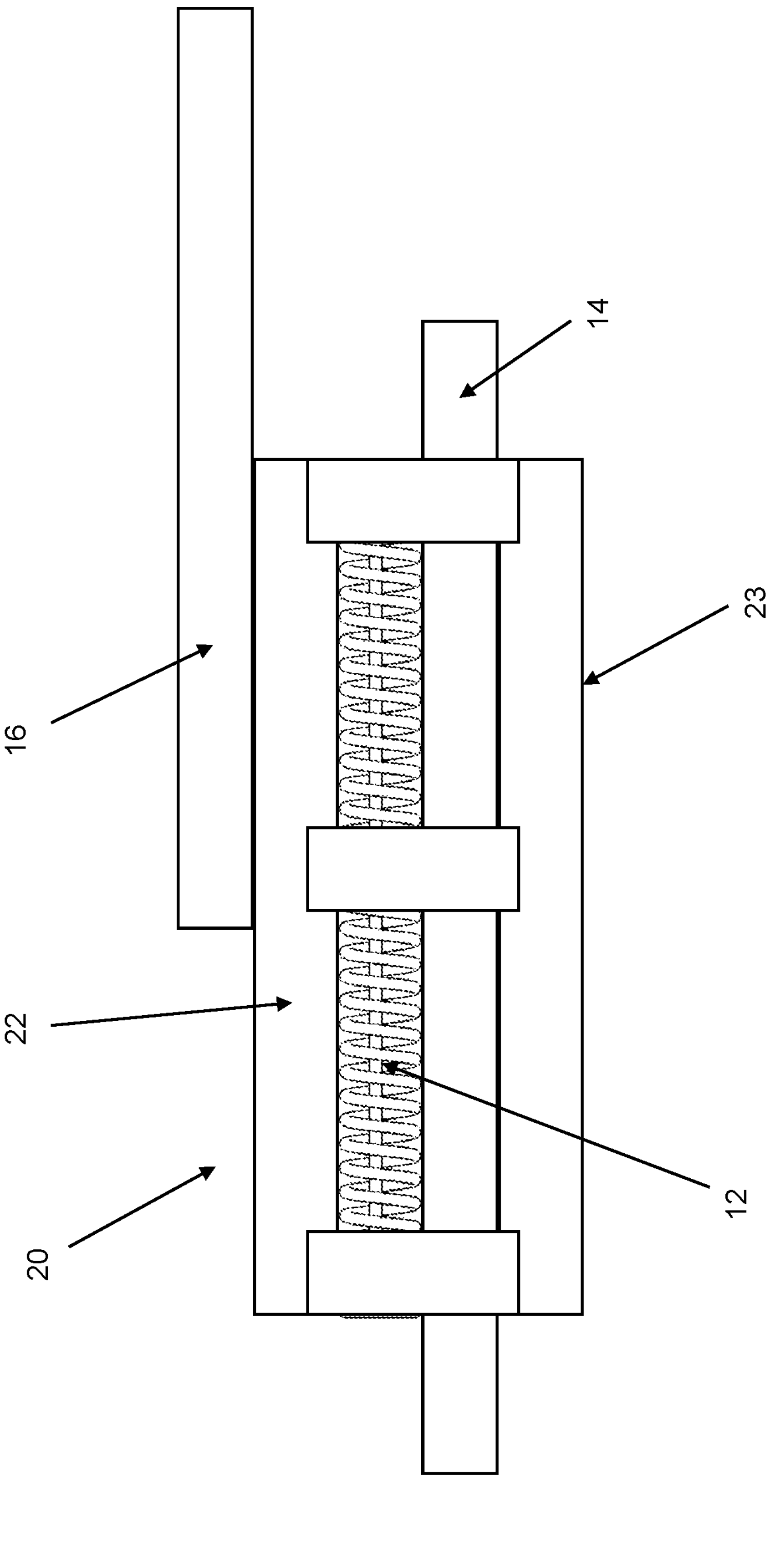
FIG. 2 shows a schematic side view of a connector having a non-tangling canted coil electrically connecting a first conductor to a second conductor.

In those embodiments, where the non-tangling canted coil(s) do not press against both conductors, the non-tangling canted coil(s) press against one or more electrically conductive structures that are electrically connected to one or both of the conductors. For example, as schematically shown in FIG. 2, a connector 20 having one or more non-tangling canted coils 12 is shown electrically connecting the first conductor 14 to the second conductor 16. One side of the one or more non-tangling canted coils 12 is pressed directly against the first conductor 14, while the other side of the one or more non-tangling canted coils 12 is pressed against an electrically conductive structure 22, which is electrically (and also physically) connected to the second conductor 16. In this manner, the connector 10 electrically connects the first conductor 14 to the second conductor 16. The structure 22 may be part of an outer clamp structure 23 that is disposed around the one or more non-tangling canted coils 12 and a portion of the first conductor 14 to clamp the one or more non-tangling canted coils 12 against the first conductor 14.

Figure 3:
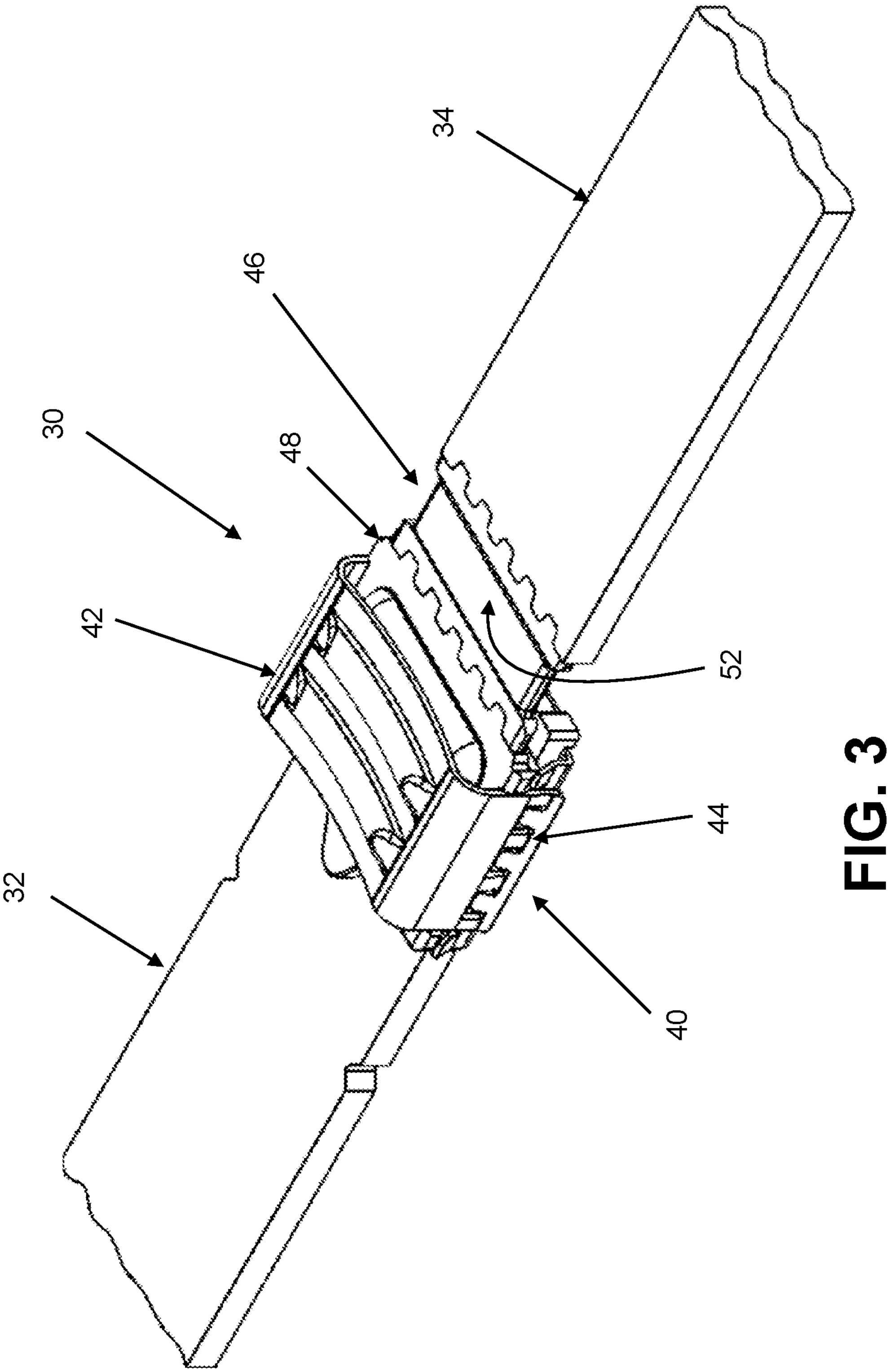
FIG. 3 shows a top perspective view of a bus bar assembly that includes a first bus bar connected by a connector assembly to a second bus bar.
Figure 4:
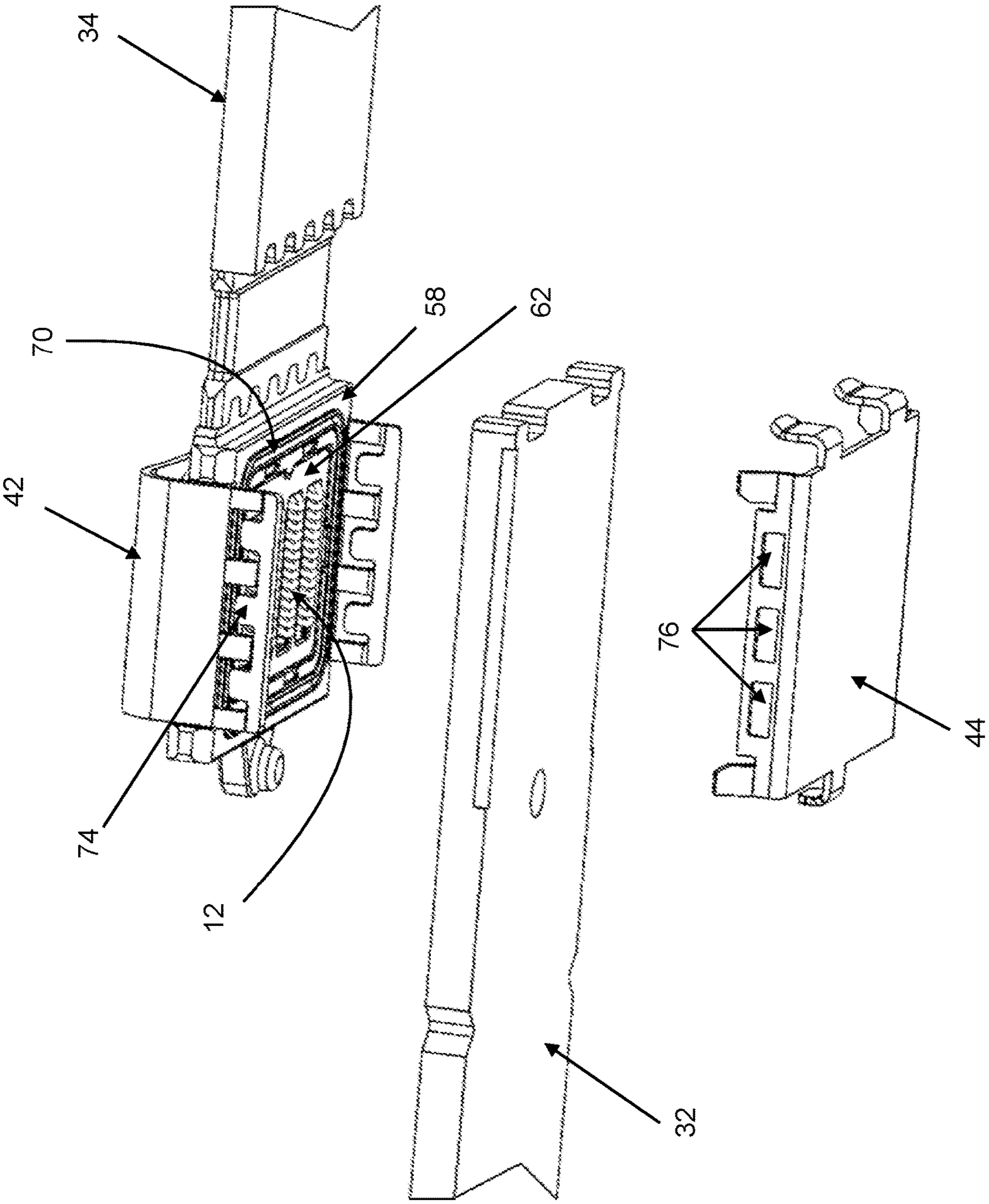
FIG. 4 shows a bottom perspective view of the bus bar assembly of FIG. 3, wherein the bus bar assembly is partially exploded to show non-tangling canted coils of the connector assembly.

Referring now to FIGS. 3-4, there is shown a bus bar assembly 30 that includes a first bus bar 32 connected by a connector assembly 40 to a second bus bar 34. The connector assembly 40 includes an upper bracket 42, a lower bracket 44, a bridge 46 and a contact assembly 48.

The first and second bus bars 32, 34 are elongated, have a generally rectangular cross-section and may be constructed from a conductive metal, such as copper or a copper alloy, which may or may not be plated with another metal, such as tin or nickel. The second bus bar 34 may have a connection end that is configured to enmesh or interlock with a first end portion of the bridge 46. The enmeshed connection end and first end portion may be secured together by welding, such as laser welding, ultrasonic welding or resistance welding. Instead of having an edge-to-edge connection, the bridge 46 and the second bus bar 34 may be connected together with a simple lap joint.

In addition to the first end portion, the bridge 46 includes a second end portion, which has crenellations or teeth that comprise a series of alternating tabs and grooves. A flexible portion 52 is joined between the first and second end portions. The flexible portion 52 may be a strap or cable of braided wire comprised of a conductive metal, such as copper or a copper alloy, which may or may not be plated with another metal, such as tin or nickel. The flexibility of the bridge 46 enables a connection to be made between two rigid assemblies that accommodates a degree of positional error (in roll, pitch and yaw) between the assemblies without affecting the proper seating of the assemblies.

The second end portion of the bridge 46 is configured to enmesh or interlock with an edge portion of a housing 58 of the contact assembly 48 to electrically and mechanically connect the housing 58 to the second bus bar 14. Instead of having an edge-to-edge connection, the bridge 26 and the housing 58 may be connected together with a simple lap joint, wherein a portion of the bridge 26 overlaps the housing 58 (or vice versa) and is welded thereto.

The housing 58 may be a unitary or monolithic structure that is formed from a conductive metal, such as copper or a copper alloy, which may or may not be plated with another metal, such as silver, tin or nickel.

In addition to the housing 58, the contact assembly 48 includes a plurality of non-tangling canted coils 12 mounted in a holding frame 62. The holding frame 62 is planar and has a plurality of slots formed therein. The non-tangling canted coils 12 are trapped within the slots so as to be secured within the housing 58. Top portions of the non-tangling canted coils 12 are disposed in a holding cavity of the housing 58 and are pressed against an interior surface of the housing 58, thereby making an electrical connection therewith.

In some embodiments, the contact assembly 48 may further include a sealing gasket 70. The sealing gasket 70 may be secured around the holding frame 62 with the non-tangling canted coils 12. The sealing gasket 80 may be comprised of silicone rubber or another type of water-resistant elastomer. The sealing gasket 70 is used to form a seal with the first bus bar 32 when the contact assembly 48 is pressed into engagement with the first bus bar 32 by the upper and lower brackets 42, 44.

The upper and lower brackets 42, 44 may each be formed from heat-treated steel or other structural material and may be provided with a zinc chromate, nickel or other protective finish. The upper bracket 42 has engagement structures 74 that are configured to interlock with second engagement structures 76 that may be formed in the lower bracket 44.

The first and second bus bars 32, 34 may be connected together with the connector assembly 40 in a number of different ways, using different sequences of steps. For example, the upper bracket 42 may be snapped into position over the housing 58 of the contact assembly 48 to fasten the contact assembly 48 to the second bus bar 14, and the lower bracket 24 may be mounted to the first bus bar 32. The two assemblies may then be aligned with each other and then pressed together to press the upper bracket 22 into engagement with the lower bracket 24 such that the engagement structures 74 in the upper bracket 42 interlock with the second engagement structures 76 in the lower bracket 44, thereby mechanically securing together the first and second bus bars 32, 34.

When the two assemblies are secured together as described above, lower portions of the non-tangling canted coils 12 are compressed against the first bus bar 32, thereby making a good electrical connection between the non-tangling canted coils 12 and the first bus bar 32. Since the non-tangling canted coils 12 are electrically connected to the second bus bar 34 through the housing 58, the first and second bus bars 32, 34 are also electrically connected together when the two assemblies are mechanically secured together using the upper and lower brackets 32, 34.

Figure 5:
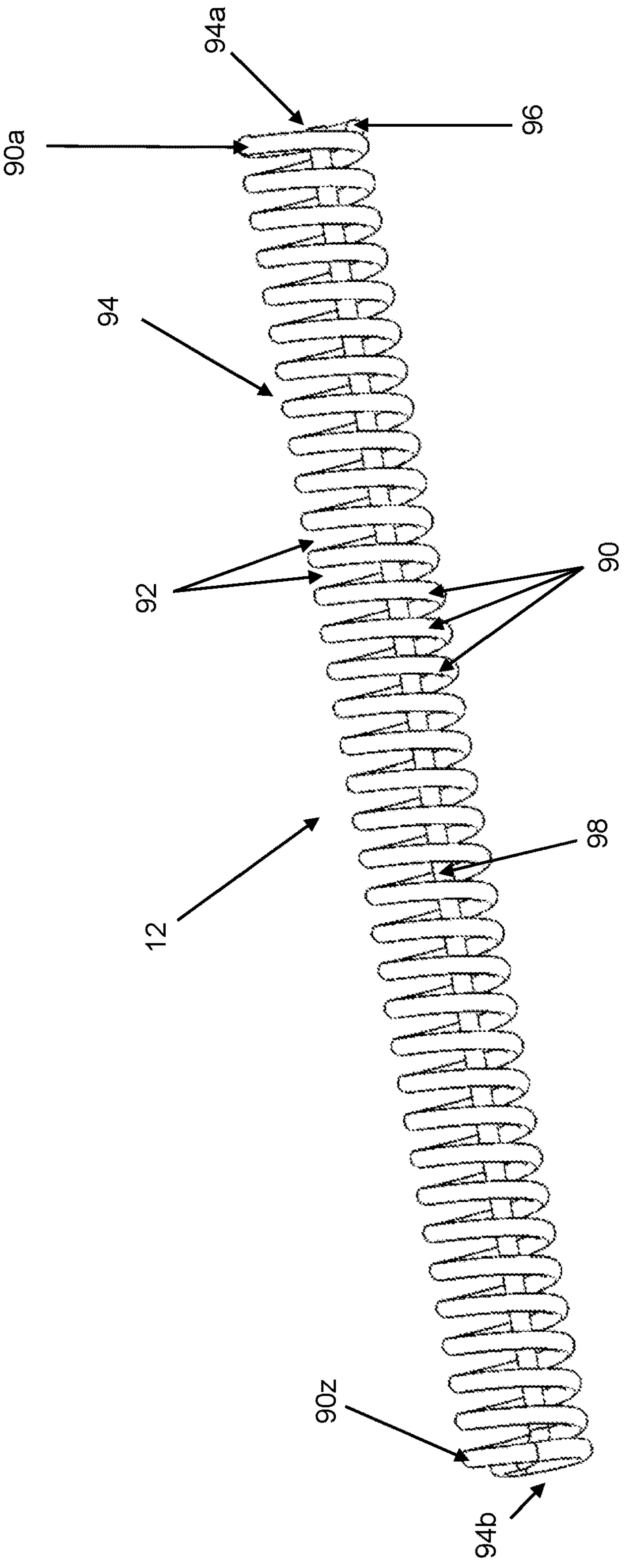
FIG. 5 shows a perspective view of a first embodiment of a non-tangling canted coil.
Figure 6:
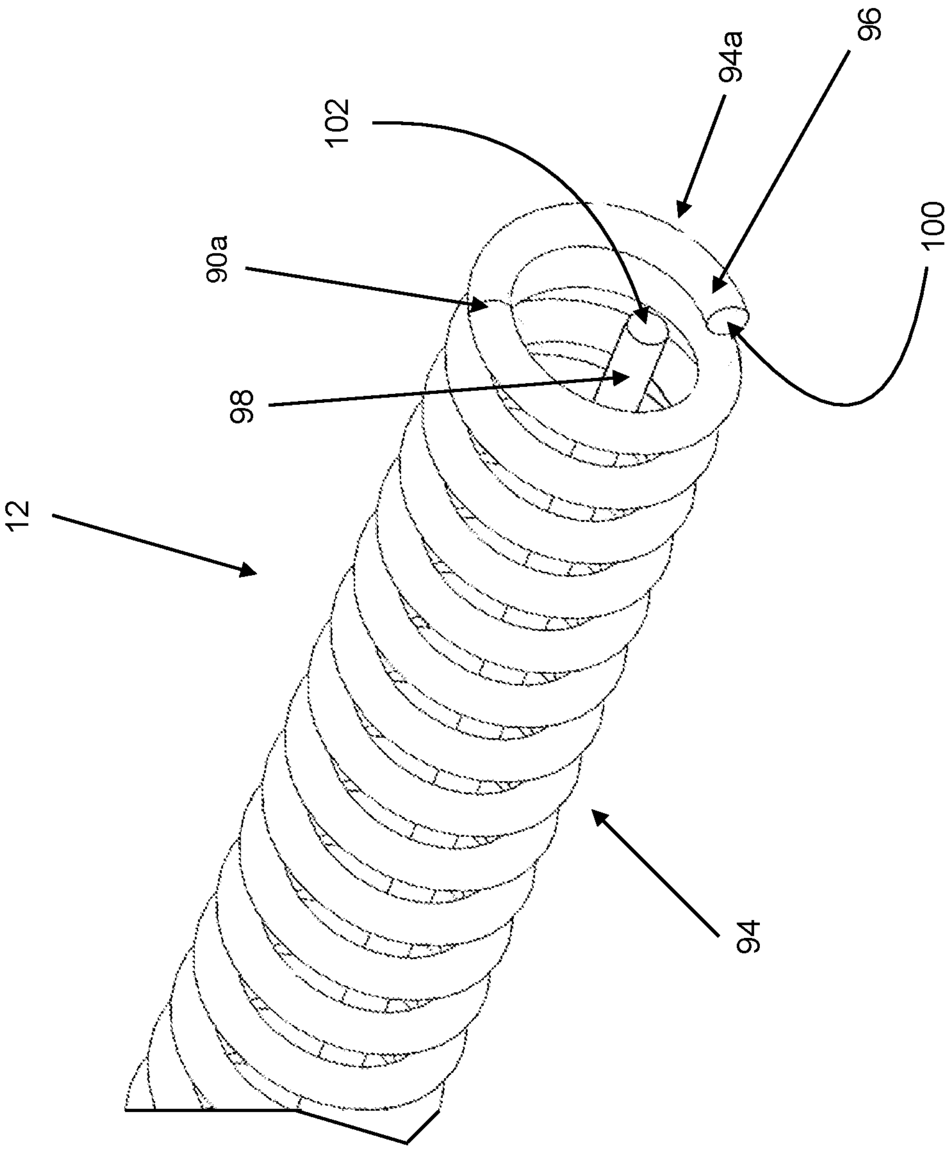
FIG. 6 shows a close-up view of a first end portion of the canted coil of FIG. 5.
Figure 7:
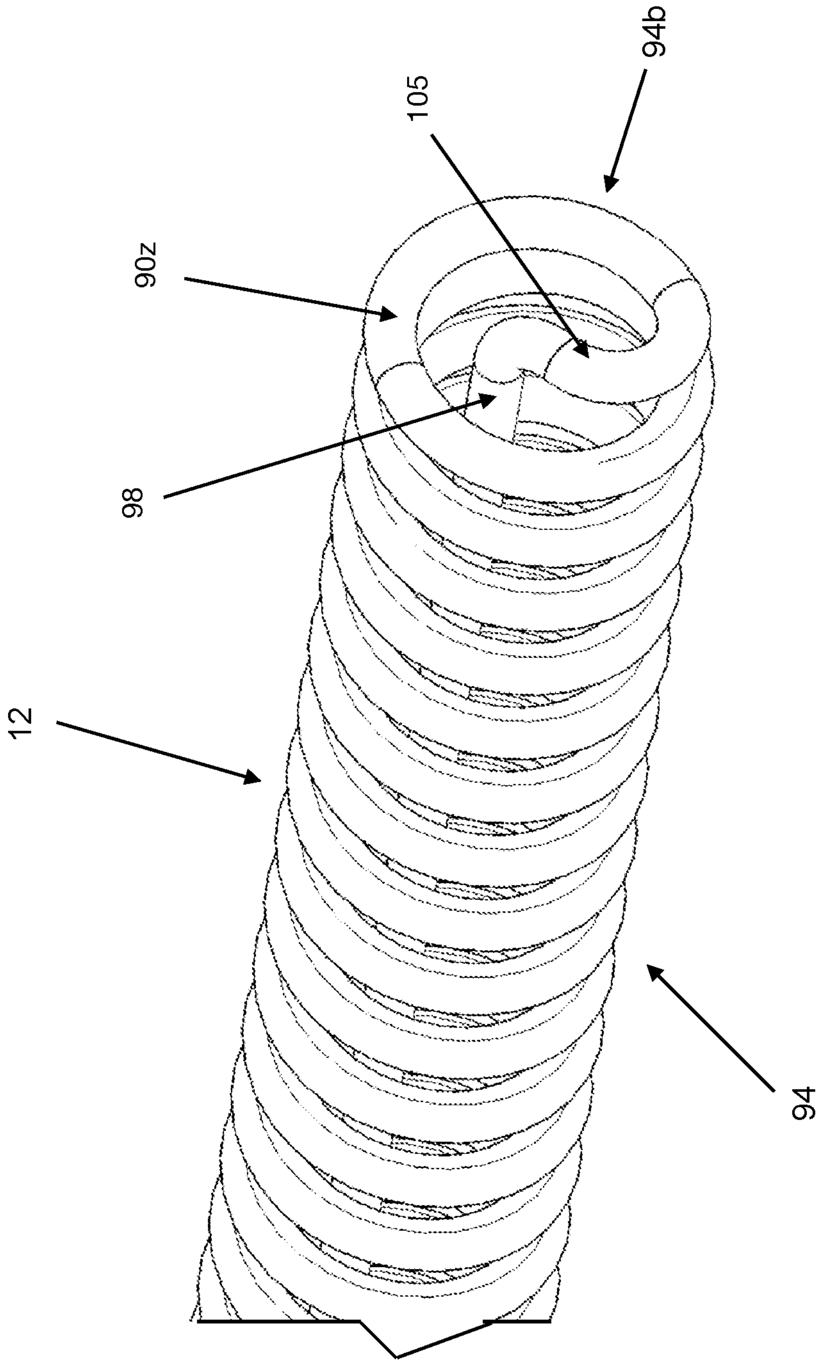
FIG. 7 shows a close-up view of a second portion of the canted coil of FIG. 6.

Referring now to FIGS. 5-7, the non-tangling canted coil 12 will now be described in more detail. The non-tangling canted coil 12 is elongated and comprises a plurality of arcuate contacts 90 that are arranged side-by-side with gaps 92 in-between to form a substantially cylindrical body 94. The canted coil 12 may be a single unitary coil having a series of adjacent turns or loops, each of which is a contact 90. The non-tangling canted coil 12 may be formed from a single length of wire having a circular cross-section. The wire 96 and, thus, the canted coil 12 may be formed from copper or, more preferably, a high conductivity, high temperature copper alloy, such as C18080, which is an alloy of copper, chromium, silicon, titanium, silver and iron. Another suitable copper alloy is C151, which is an alloy of copper and zirconium. The non-tangling canted coil 12 may be plated with silver. The canted coil 12 is pre-loaded and is at least slightly canted in an axial direction. More specifically, the contacts 90 are canted in the axial direction from about 1° to about 45° from the vertical, more usually about 30° from the vertical. The gaps between the contacts (loops) 90 may have a dimension that is greater than the thickness of the contacts 90, i.e., greater than the diameter of the wire forming the non-tangling canted coil 12.

A blocking bar 98 extends through the body 94 between opposing first and second end portions 94*a,b* of the body 94. If the canted coil 12 is a single unitary coil, the blocking bar 98 is integral with the body 94 of the canted coil 12. For example, the first end portion 94*a* may include opposing ends 100, 102 of the wire 96 forming the canted coil 12. From the end 100, the wire bends into a first contact 90*a* in the first end portion 94*a* and thence into successive contacts 90 as the wire proceeds in the direction toward the second portion 94*b*. In the second end portion 94*b*, the wire forms a final contact 90*z* that is joined to a pigtail 105 of the blocking bar 98. The pigtail 105 extends axially outward at least as far as the final contact 90*z*. From the pigtail 105, the blocking bar 98 (wire) extends linearly back to the first end portion 94*a*, where it terminates at the free end 100. The presence of the blocking bar 98 inside the body 94 of a first canted coil 12 prevents a contact (loop) 90 from a second canted coil 12 from extending into a gap 92 in the first canted coil 12. In this manner, the blocking bars 98 in a plurality of canted coils 12 prevent the canted coils 12 from becoming entangled during storage and/or handling.

Figure 8:
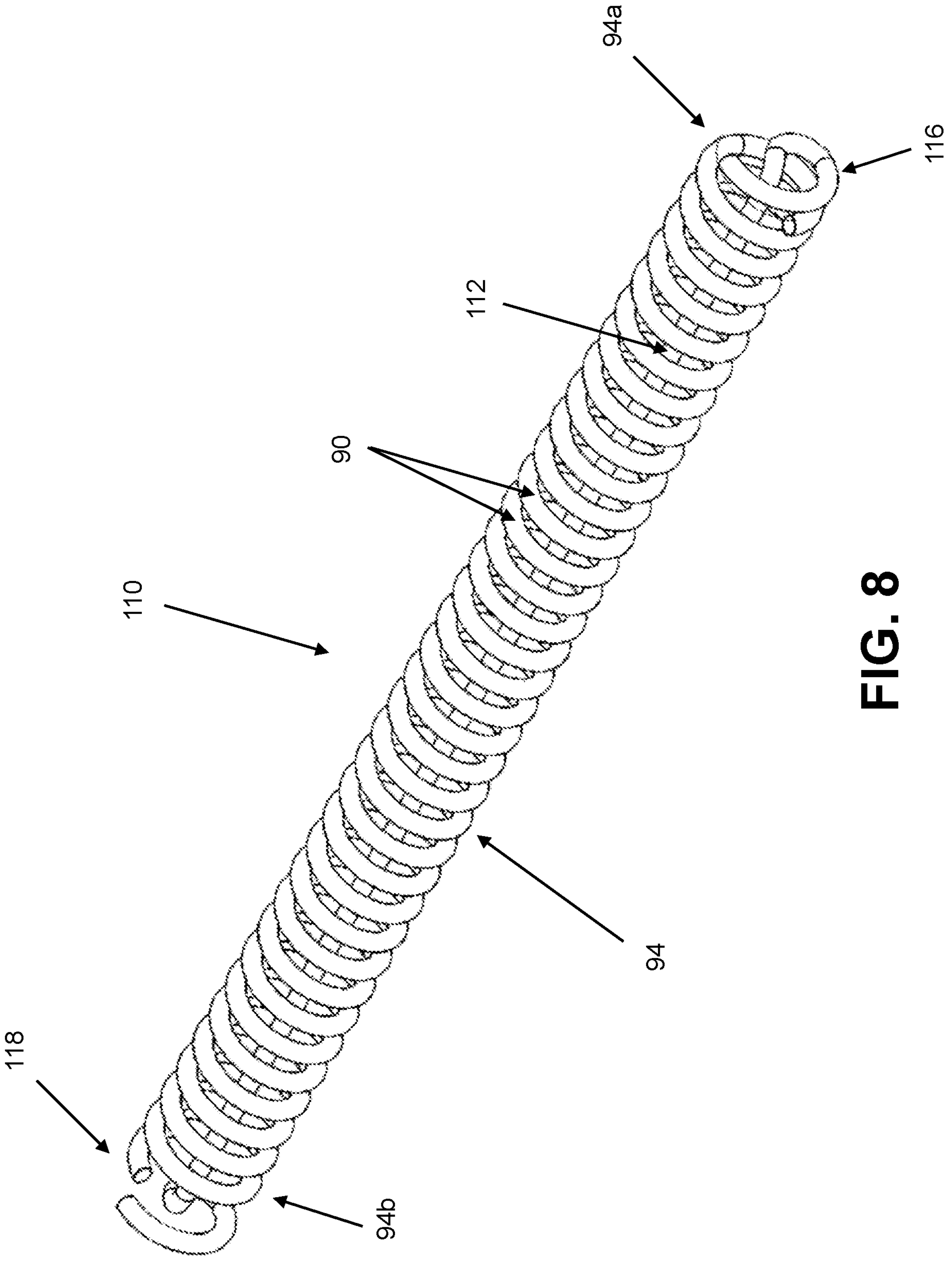
FIG. 8 shows a perspective view of a second embodiment of a non-tangling canted coil.
Figure 9:
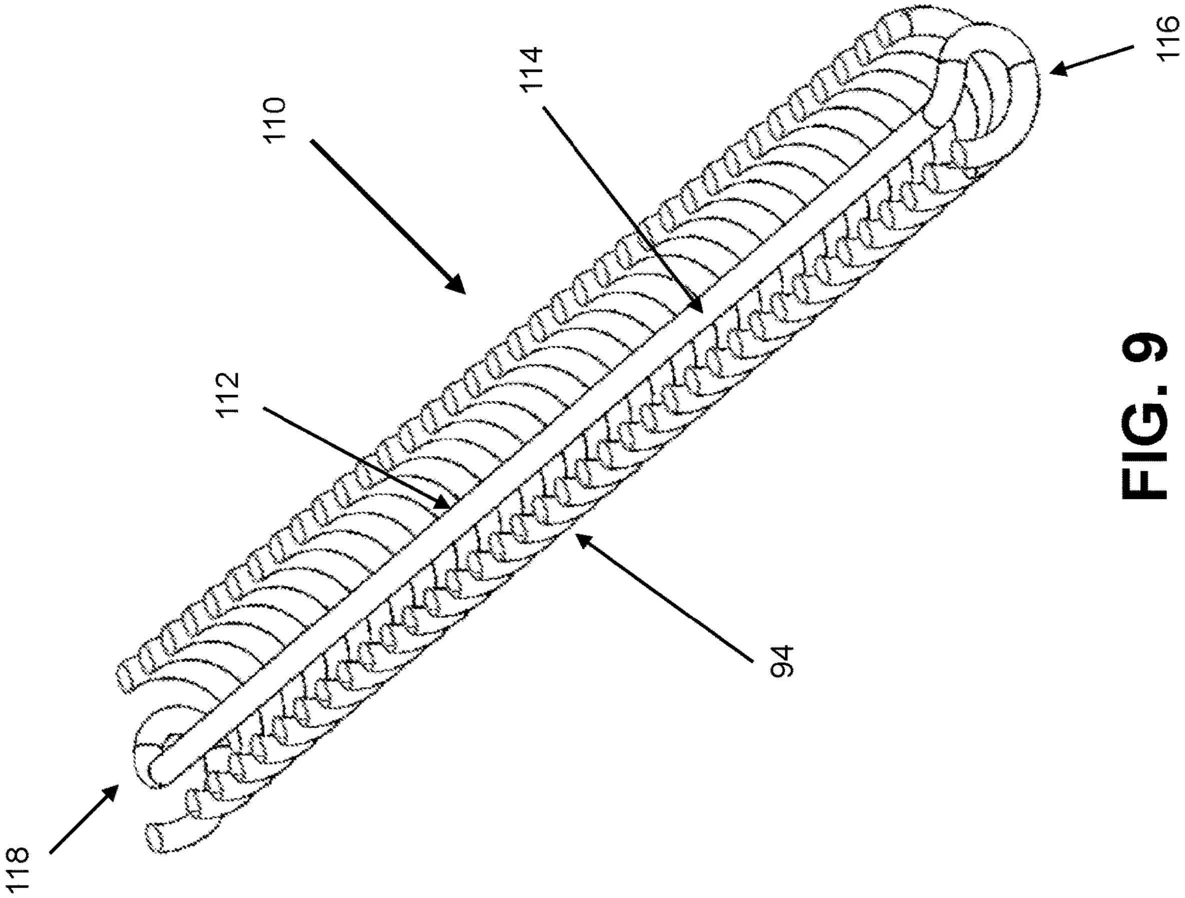
FIG. 9 shows a sectional view of the canted coil of FIG. 8.

Referring now to FIG. 8-9, a non-tangling canted coil 110 constructed in accordance with a second embodiment is shown. The canted coil 110 has the same construction and function as the canted coil 12, except the canted coil 110 does not have a blocking bar 98 that is integral with the body 94. Instead, the canted coil 110 has a blocking bar 112 that is separate from the body 94. The blocking bar 112 extends linearly through the body 94 between the opposing first and second end portions 94*a,b* of the body 94. The blocking bar 112 includes a linearly-extending main section 114 joined between first and second pigtails 116, 118, which are disposed axially outward from the end portions 94*a,b* of the body 94. The first and second pigtails 116, 118 have about the same diameter as the contacts (loops) 90 and, thus, cannot be moved through the body 94. In other words, the body 94 is trapped between the first and second pigtails 116, 118. As such, one or more of the pigtails 116, 118 are formed after the linear section 114 is fully inserted into the body 94.

Since the blocking bar 112 is separate from the body 94, the blocking bar 112 may have a different composition than the body 94. For example, the blocking bar 112 may simply be formed from steel, copper or a copper alloy. Alternately, the blocking bar 112 may have the same composition as the body 94. Also, the blocking bar 112 may be formed from wire having either a circular or a rectangular cross-section.

Each of the pigtails 105, 114, 116 has at least one major bend and at least one minor bend. The major bend may be about 180° and the minor bend may be about 90°.

Figure 10:
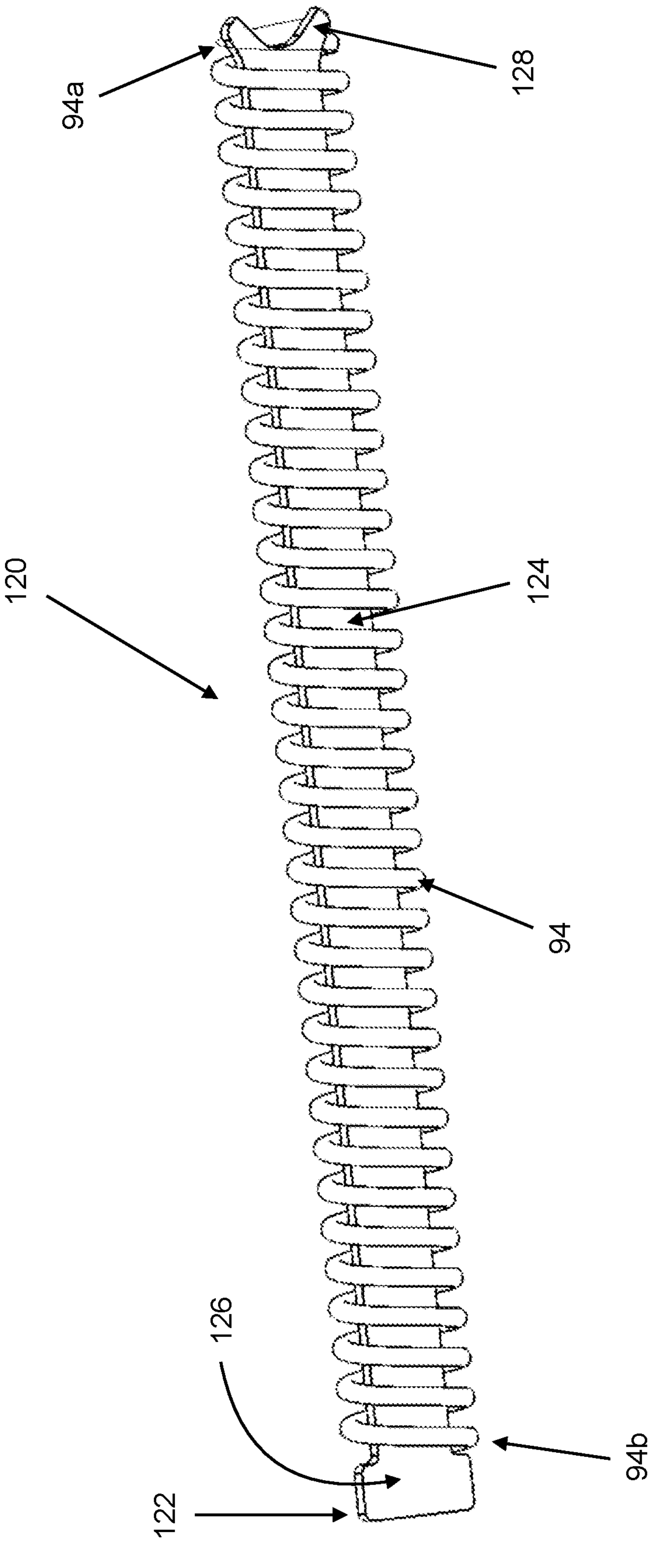
FIG. 10 shows a perspective view of a third embodiment of a non-tangling canted coil.

Referring now to FIG. 10, a non-tangling canted coil 120 constructed in accordance with a third embodiment is shown. The canted coil 120 has the same construction and function as the canted coil 12, except the canted coil 120 does not have a blocking bar 98 that is integral with the body 94. Instead, the canted coil 120 has a blocking bar 122 that is separate from the body 94. The blocking bar 122 extends linearly through the body 94 between the opposing first and second end portions 94*a,b* of the body 94. The blocking bar 122 may be flat and stamped from sheet metal composed of steel, copper, copper alloy or another metal. The blocking bar 122 may have a main section 124 that extends linearly between an expanded rectangular end 126 and an expanded grooved end 128. The grooved end 128 has cammed surfaces to permit the blocking bar 122 to be inserted into the body 94, with the grooved end 128 being inserted first. The cammed surfaces of the grooved end 128 permit the grooved end 128 to expand the links 90 and thereby pass through them when being inserted. When the blocking bar 122 is fully inserted into the body 94, at least portions of the rectangular end 126 and the grooved end 128 are disposed axially outward from the end portions 94*a,b* of the body 94. The rectangular end 126 and the grooved end 128 have about the same diameter as the contacts (loops) 90 and, thus, cannot be easily moved through the body 94. In other words, the body 94 is trapped between the rectangular end 126 and the grooved end 128.

It should be appreciated that the blocking bars 112 in a plurality of canted coils 110 prevent the canted coils 110 from becoming entangled during storage and/or handling, and that the blocking bars 122 in a plurality of canted coils 120 prevent the canted coils 120 from becoming entangled during storage and/or handling. In addition, the canted coils 110 or the canted coils 120 may be used in the connector 10 and the bus bar assembly 30 in lieu of the canted coils 12.

It is to be understood that the description of the foregoing exemplary embodiment(s) is (are) intended to be only illustrative, rather than exhaustive. Those of ordinary skill will be able to make certain additions, deletions, and/or modifications to the embodiment(s) of the disclosed subject matter without departing from the spirit of the disclosure or its scope.

What is claimed is:

1. A canted coil for use in making an electrical connection, the canted coil comprising:

a substantially cylindrical body formed from at least one length of conductive wire and having a series of adjacent loops with gaps in-between, the body having a linear axis and opposing first and second end portions, through which the linear axis extends, and the loops being canted in the direction of the linear axis; and a metal blocking bar having a linear section disposed inside the body and extending from the first end portion of the body to the second end portion of the body; and wherein the blocking bar is an integral part of the canted coil, which is a unitary structure formed from a single length of the conductive wire.

2. The canted coil of claim 1, wherein the linear section of the blocking bar has a second end joined to a pigtail that extends axially outward at least as far as the corresponding second end portion of the body of the canted coil.

3. The canted coil of claim 2, wherein the linear section of the blocking bar has a free first end disposed at the first end portion of the body of the canted coil.

4. The canted coil of claim 1, wherein the gaps in the body are wider than the diameter of the conductive wire.

5. The canted coil of claim 1, wherein both ends of the single length of the conductive wire are located at the first end portion of the body of the canted coil.

6. The canted coil of claim 1, wherein the wire comprises a copper alloy plated with silver.

7. A conductor assembly comprising the canted coil of claim 1, and further comprising:

first and second conductors electrically connected together by the canted coil.

8. The conductor assembly of claim 7, wherein the canted coil presses against the first conductor.

9. The conductor assembly of claim 8, wherein the canted coil also presses against the second conductor.

10. The conductor assembly of claim 8, further comprising a structure against which the canted coil also presses, the structure being electrically and mechanically connected to the second conductor.

* * * * *